United States Patent
Zhu et al.

(10) Patent No.: US 8,588,044 B2
(45) Date of Patent: Nov. 19, 2013

(54) CD/DVD MODE SELECTION CONTROL USING LASER DIODE VOLTAGE

(75) Inventors: Yan Zhu, Jiangsu (CN); BoWen Chen, Shenzhen (CN); ZengLian Liu, Shenzhen (CN); YaHui Dong, Shenzhen (CN)

(73) Assignee: CSR Technology Inc., Sunnyvale, CA (US)

( * ) Notice: Subject to any disclaimer, the term of this patent is extended or adjusted under 35 U.S.C. 154(b) by 71 days.

(21) Appl. No.: 12/532,822

(22) PCT Filed: Aug. 20, 2008

(86) PCT No.: PCT/CN2008/001501
§ 371 (c)(1),
(2), (4) Date: Sep. 23, 2009

(87) PCT Pub. No.: WO2010/020075
PCT Pub. Date: Feb. 25, 2010

(65) Prior Publication Data
US 2011/0199875 A1    Aug. 18, 2011

(51) Int. Cl.
*G11B 5/09* (2006.01)
*G11B 7/00* (2006.01)
*G11B 5/58* (2006.01)
*G11B 5/55* (2006.01)

(52) U.S. Cl.
USPC ............... 369/47.35; 369/44.14; 369/44.17; 369/47.15; 369/59.11; 369/44.11; 369/47.25; 369/47.28; 369/124.12; 369/44.41; 369/53.22; 369/53.27

(58) Field of Classification Search
USPC .......... 369/47.35, 44.14, 44.17, 47.15, 59.11, 369/44.11, 47.25, 47.28, 124.12, 44.41, 369/53.22, 53.27
See application file for complete search history.

(56) References Cited

U.S. PATENT DOCUMENTS

| | | | | |
|---|---|---|---|---|
| 5,742,569 | A * | 4/1998 | Yamamoto et al. | 369/30.18 |
| 5,903,531 | A | 5/1999 | Satoh et al. | 369/44.29 |
| 6,813,232 | B1 | 11/2004 | Sunagawa et al. | 369/53.2 |
| 2003/0223325 | A1* | 12/2003 | Shimano et al. | 369/44.26 |
| 2004/0233814 | A1* | 11/2004 | Nishimura et al. | 369/59.11 |
| 2007/0133366 | A1* | 6/2007 | Sawada | 369/44.35 |
| 2008/0056086 | A1* | 3/2008 | Kuroda | 369/53.26 |
| 2008/0084805 | A1* | 4/2008 | Chen | 369/59.11 |

FOREIGN PATENT DOCUMENTS

| | | |
|---|---|---|
| CN | 1341328 A | 3/2002 |
| CN | 1802699 A | 7/2006 |
| JP | 2002245653 A | 8/2002 |

OTHER PUBLICATIONS

International Search Report and Written Opinion issued in PCT/CN2008/001501, Jun. 4, 2009, 9 pages.

* cited by examiner

*Primary Examiner* — Aneeta Yodichkas
(74) *Attorney, Agent, or Firm* — Morgan, Lewis & Bockius LLP (57) ABSTRACT

Circuitry for controlling mode selection of a CD/DVD reader is described. In one embodiment, the CD/DVD reader has a first device having at least one analog output, a second device having at least one digital input and at least one analog input, and an interface circuit coupling the analog output of the first device to the digital input and the analog input in the second device. The interface circuit includes a circuitry to use a single control signal from the analog output of the first device to control the digital input and the analog input in the second device. Other embodiments are also described.

17 Claims, 8 Drawing Sheets

| DVD Mode | | | | |
|---|---|---|---|---|
| DVD_LD Output (DSP) | CD_LD Output (DSP) | DVD_LD Input (OPU) | CD_LD Input (OPU) | Mode Selection (OPU) |
| Vs - (1 to 1.5V) | Vs (~3.3V to 5V) | Analog High (~2.0 to 2.5V) | Analog Low (0V) | Logic Low (0V) |

Fig. 5A

| CD Mode | | | | |
|---|---|---|---|---|
| DVD_LD Output (DSP) | CD_LD Output (DSP) | DVD_LD Input (OPU) | CD_LD Input (OPU) | Mode Selection (OPU) |
| Vs (~3.3V to 5V) | Vs - (1 to 1.5V) | Analog Low (0V) | Analog High (~1.8 to 2.2V) | Logic High (5V) |

CD/DVD MODE SELECTION CONTROL USING LASER DIODE VOLTAGE

CROSS REFERENCE TO RELATED APPLICATIONS

This Application is a United States National Stage Application filed under 35 U.S.C. §371 of PCT Patent Application Serial No. PCT/CN2008/001501 filed on Aug. 20, 2008, the disclosure of which is hereby incorporated by reference in its entirety.

TECHNICAL FIELD

The disclosed embodiments related generally to the field of optical disc readers and to circuitry for selectively reading data from either a CD or DVD.

BACKGROUND

Karaoke is a form of entertainment in which individuals sing along with recorded music. A karaoke player plays recorded music, typically from a CD or DVD, and mixes the recorded music with audio input from a microphone. The number of features available in a karaoke player is sometimes determined by the number of different processing functions the internal circuitry can perform and the number of outputs available in a digital signal processor used to perform at least some of those processing functions. An optical sensor of the karaoke player, or a CD/DVD reader, may have different modes of operations for reading data from a CD or a DVD.

SUMMARY OF EMBODIMENTS

In some embodiments, a CD/DVD reader has a first device having an analog output, a second device having a digital input and an analog input, and an interface circuit coupling the analog output of the first device to the digital input and the analog input of the second device. The interface circuit includes a circuitry to use a single control signal from the analog output of the first device to control the digital input and the analog input of the second device. In some embodiments, the first device and the second device are components of a CD/DVD player, where the first device is a digital signal processor and the second device is an optical pick-up head unit, and the CD/DVD reader is a part of a karaoke player.

In some embodiments, the second device includes an optical sensor for converting optical signals reflected by a CD or a DVD into electrical signals, and the digital input of the second device is a mode selection signal that is configured to selected one of two modes in the optical sensor: (i) to detect CD laser light in a first mode and (ii) to detect DVD laser light in a second mode. Furthermore, in another embodiment, the second device also includes a CD laser and a DVD laser where the analog input of the second device is used for activation of one of the CD laser and DVD laser for reading data from a CD or a DVD.

BRIEF DESCRIPTION OF THE DRAWINGS

FIGS. 5A and 513 are tables illustrating DSP outputs and OPU inputs in the DVD mode and CD mode, respectively, in accordance with some embodiments.

Like reference numerals refer to corresponding parts throughout the drawings.

DESCRIPTION OF EMBODIMENTS

As noted above, an optical sensor of a karaoke player, or a CD/DVD reader (also sometimes called a CD/DVD player or CD/DVD audio player), may have a different mode of operation for reading data from a CD than the mode of operation used for reading data from a DVD. When a disc is inserted into the karaoke player, the player determines the type of disc. In some embodiments, a digital signal processor (DSP) in the karaoke player determines the type of disk that is being read by the player, and an output of the DSP selects a mode for an optical sensor in the karaoke player to read the appropriate type of light signal reflected by a disc of corresponding type. The DSP also controls other signal processing functions in the karaoke player, some of which implement different user features. The type, variety or number of signal processing functions that the karaoke player or CD/DVD player can perform may be limited by the number of independent outputs on the DSP. Therefore, if the number of DSP outputs dedicated to a particular function is decreased, the number of DSP outputs available for other features can be increased for the same total pin count. Alternatively, the total pin count of the DSP can be reduced if the number of DSP outputs for other features remains the same.

Figure 1A:
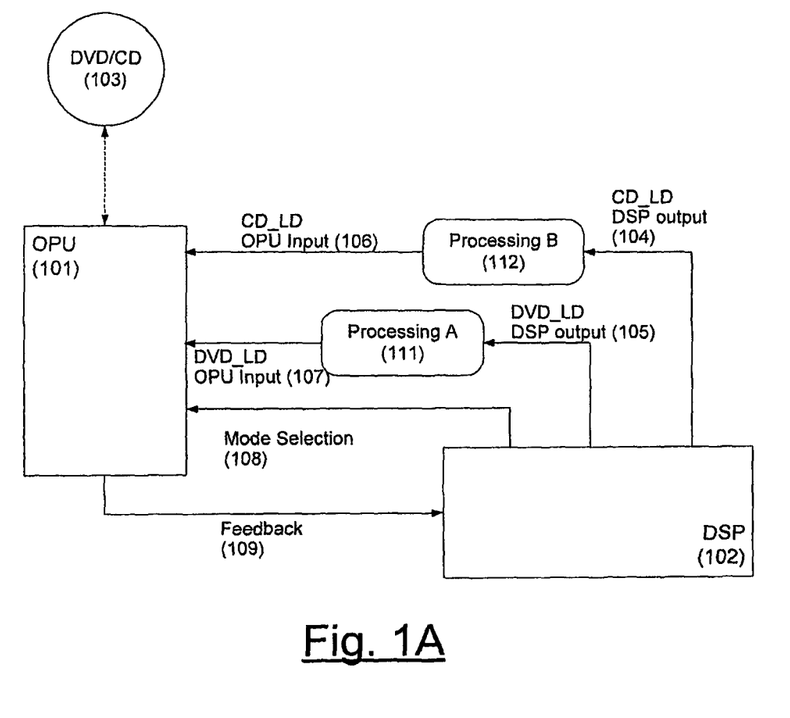
FIG. 1A is a block diagram of a digital signal processor (DSP) and an optical pickup unit (OPU) with a mode selection control signal from the DSP to control mode selection in the OPU in accordance with some embodiments.
Figure 1B:
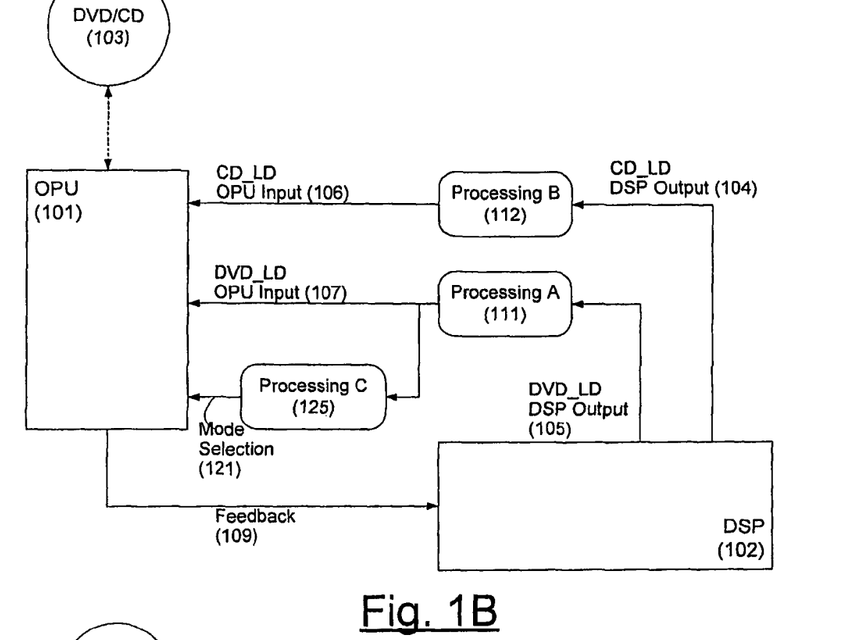
FIG. 1B is a block diagram of a DSP and an OPU with a mode selection control signal that is generated by interface circuit from a DVD laser control signal from the DSP in accordance with some embodiments.
Figure 1C:
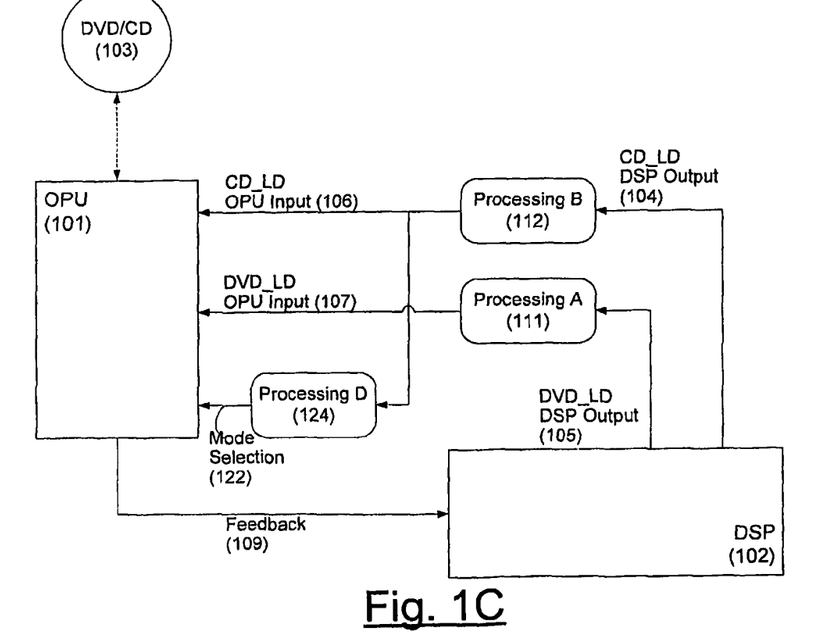
FIG. 1C is a block diagram of a DSP and an OPU with a mode selection control signal that is generated by interface circuit from a CD laser control signal from the DSP in accordance with some embodiments.

FIGS. 1A, 1B and 1C show three embodiments of circuits coupling a DSP 102 to an optical pick-up unit (OPU) 101, where both the DSP and OPU are components of a device capable of reading both DVD's and CD's. For example, the device may be an CD/DVD player or a karaoke player. The OPU 101 is the component in a CD/DVD player or a karaoke player that controls the reading of a DVD or CD. FIG. 1A is a block diagram of a digital signal processor (DSP) and an optical pickup unit (OPU) with a mode selection control signal from the DSP to control mode selection in the OPU 101, in accordance with some embodiments. The DSP 102 controls operation of the OPU 101, which responds to commands from the DSP 102. In some embodiments, a DSP output herein called DVD_LD 105 is processed by circuitry (processing A) 111 to become a DVD_LD input 107 to the OPU 101, which enables the OPU to drive a DVD laser diode to emit optical (e.g., red) light signals to read a DVD. Similarly, a DSP output herein called CD_LD 104 is processed by circuitry (processing B) 112 to become a CD_LD input 106 into the OPU 101, which enables the OPU to drive a CD laser diode to emit optical (e.g., infrared) light signals to read a CD. The DSP 102 activates either the DVD_LD output 105 or the CD_LD output 104, but does not activate both at the same time.

In the embodiments depicted in FIG. 1A, the DSP 102 outputs a mode selection signal 108 in addition to the DVD_LD 105 and the CD_LD 104 outputs. The mode selection signal 108 is a digital signal that selects between a DVD mode and a CD mode for a sensor in the OPU 101 to receive optical light waves reflected from a DVD or a CD. In some embodiments, the default value of the mode selection signal 108 is a "DVD mode" value, and furthermore the DSP activates the DVD_LD output 105 by default, thereby commanding the OPU to operate in a DVD mode. In other embodiments, the default value of the mode selection signal 108 is a "CD mode" value, and the DSP activates the CD_LD output 104 by default, thereby commanding the OPU to operate in a CD mode.

In some embodiments, a feedback signal 109 is generated and transmitted by the OPU to the DSP. From processing the feedback signal 109, the DSP can learn whether the proper mode is selected. In some embodiments, the feedback signal 109 has a first predefined value when the current CD/DVD mode is compatible with the optical disc being read, and a second predefined value (different from the first predefined value) when the current CD/DVD mode is not compatible with the optical disc being read. Thus, if the device is in CD mode, but the optical disc being read is a DVD, the OPU sends to the DSP a feedback signal 109 having a value that indicates that the current CD/DVD mode is not compatible with the optical disc being read. And if the device is in CD mode, and the optical disc being read is a CD, the OPU sends to the DSP a feedback signal 109 having a value that indicates that the current CD/DVD mode is compatible with the optical disc being read. In some other embodiments, the feedback signal 109 has one predefined value when the optical disc being read is a CD, and a second predefined value (different from the first predefined value) when the optical disc being read is a DVD.

FIG. 1B is a block diagram of a circuit that includes a DSP 102 and an OPU 101, with a mode selection control signal 121 that serves the same purpose as the mode selection signal 108 described above. Thus, the mode selection control signal 121 is a digital signal that selects between a DVD mode and a CD mode for a sensor in the OPU 101 to receive optical light waves reflected from a DVD or a CD. FIG. 1B differs from FIG. 1A in that the mode selection signal 121 is not generated by the DSP 102. Instead, the mode selection control signal 121 is generated by an interface circuit (processing C circuit 125) from a DVD laser control signal produced by the DSP 102, in accordance with some embodiments. Stated in another way, the mode selection signal 121 is derived from a DVD laser control signal, DVD_LD OPU signal 107, by processing C circuit 125. More specifically, the DSP output called DVD_LD DSP 105 is processed by circuitry (processing A) 111 to generate the DVD_LD OPU signal 107, which is input to the OPU 101. When the DVD_LD OPU signal 107 is turned on, or enabled, it enables the OPU to drive a DVD laser diode to emit optical light signals to read a DVD. Processing C circuit 125 receives and processes the DVD_LD OPU signal 107 to generate the mode selection signal 121. As a result, the DSP 102 no longer has to dedicate an output pin of the DSP for transmitting a mode selection signal to the OPU. Instead, that output pin of the DSP can now be used for another function, such as outputting a digital audio signal, inputting the infrared remote control signal or the keypad signals, or serving as an input pin for external modules including secure digital card or USB drive.

FIG. 1C is a block diagram of a circuit that includes a DSP 102 and an OPU 101 with a mode selection control signal 122 that serves the same purpose as the mode selection signal 108 described above. Thus, the mode selection control signal 122 is a digital signal that selects between a DVD mode and a CD mode for a sensor in the OPU 101 to receive optical light waves reflected from a DVD or a CD. The mode selection control signal 122 is generated by an interface circuit (processing D circuit 124) from a CD laser control signal produced by the DSP 102, in accordance with some embodiments. Stated another way, in these embodiments the mode selection signal 122 is derived from a CD laser control signal by processing D circuit 124. More specifically, the DSP output called CD_LD DSP 104 is processed by circuitry (processing B) 112 to generate the CD_LD OPU 106 signal, which is input to the OPU 101. When the CD_LD OPU signal 106 is turned on, or enabled, it enables the OPU to drive a CD laser diode to emit optical light signals to read a CD. Processing D circuit 124 receives and processes the CD_LD OPU signal 106 to generate the mode selection signal 122. As a result, the DSP 102 no longer has to dedicate an output pin of the DSP for transmitting a mode selection signal to the OPU 101. Instead, as discussed above, that output pin of the DSP can now be used for another function, such as outputting a digital audio signal, inputting the infrared remote control signal or the mute control signal, or serving as an input pin for external modules including secure digital card or USB drive.

In other embodiments, the mode selection signal is generated by an interface circuit from the DVD_LD DSP output 105 or CD_LD DSP output 104.

Figure 2A:
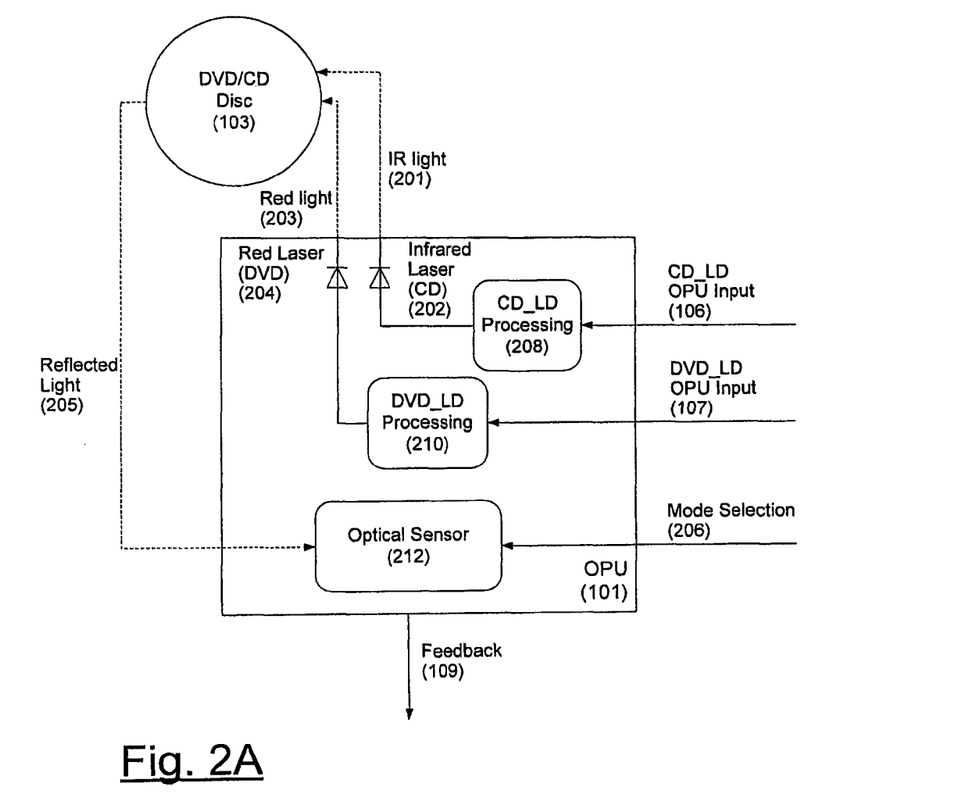
FIG. 2A is a block diagram of components within an OPU in accordance with some embodiments.

As noted above, the Optical Pickup Unit (OPU) 101 is the component in a DVD/CD player or a karaoke player that controls the reading of a DVD or CD. FIG. 2A is a block diagram of components within an OPU in accordance with some embodiments. In some embodiments, only one of the DVD_LD OPU input 107 and the CD_LD OPU input 106 is activated at one time. In the DVD mode, the DVD_LD OPU input 107 is activated and is processed by a DVD_LD processing circuit 210 to drive a specific laser diode, for example a red laser diode 204 (e.g., the DVD_LD of Sony's SLD6163RL dual-wavelength laser diode) for reading a DVD. In some embodiments, the red laser diode 204 is a component of the DVD_LD processing circuit 210. In some embodiments, the DVD_LD processing circuit 208 is a metal wire or an inductor. The red laser diode 204 emits the red light 203 (hereinafter red light) at a wavelength of 650 nm, which is reflected by a DVD. The reflected red light is an optical signal that is sensed and processed by an optical sensor 212 in the OPU 101. The CD_LD OPU input 106 is not activated in the DVD mode.

In the CD mode, the CD_LD OPU input 106 is activated and is processed by a CD_LD processing circuit 208 to drive a specific laser diode, for example an infrared laser diode 202 (e.g., the CD_LD of Sony's SLD6163RL dual-wavelength laser diode) for reading a CD. In some embodiments, the infrared laser diode 202 is a component of the CD_LD processing circuit 208. In some embodiments, the CD_LD processing circuit 208 is a metal wire or an inductor. The infrared laser diode 202 emits infrared light 201, which is reflected by a CD. The reflected infrared light is an optical signal that is sensed and processed by the optical sensor 212 in the OPU 101. The DVD_LD OPU input 107 is not activated in the CD mode. Thus, the electrical signal of the DVD_LD OPU input 107 or the CD_LD OPU input 106 are converted into optical signals in the OPU for reading a DVD or CD.

The optical sensor 212 in the OPU 101 is controlled by the mode selection signal 206 (e.g., corresponding to mode selection signal 121 or 122 of FIG. 1B or 1C). The optical sensor 212 serves to convert optical signals, such as reflected light from an optical disc, to electrical signals. The optical sensor 212 can be in any one of a plurality of distinct modes; two modes are described here. The mode selection signal 206 instructs the optical sensor 212 to read reflected light 205 from an optical disc in a DVD mode or a CD mode. In some embodiments, the optical sensor 212 includes multiple photo detection cells that are configured to convert different types of received optical signals into one or more electrical signals.

Figure 2B:
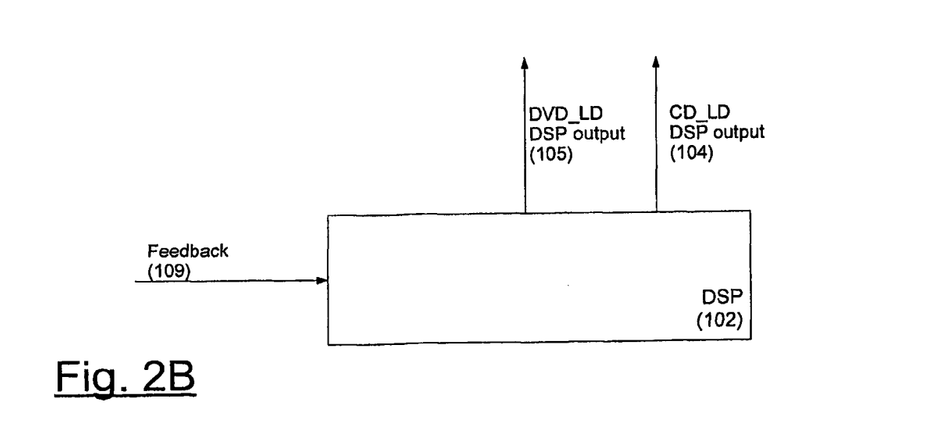
FIG. 2B is a block diagram illustrating some input and outputs of a DSP in accordance with some embodiments.

FIG. 2B is a block diagram illustrating some input and outputs of a DSP in accordance with some embodiments. Feedback signal 109, and how it is used by DSP 102, is discussed above. DVD_LD DSP output 105 and CD_LD DSP output 104 are outputs generated by the DSP 102 to control the mode of operation of an OPU. While both the DVD_LD DSP output 105 and the CD_LD DSP output 104 are shown in FIG. 2B, at most one of these two signals is active at any time. The DSP 102 has additional inputs and outputs, not shown in FIG. 2B.

When no optical disc is being read, both the DVD_LD DSP Output 105 and the CD_LD DSP output 104 are inactive (i.e., the DSP does not activate either of these laser drive signals). Furthermore, when no optical disc is being read, the logical value of the mode signal is relatively unimportant; in some embodiments the logical value of the mode signal has no impact on the operation of the OPU when both laser drive signals 104 and 105 are inactive.

Figure 3:
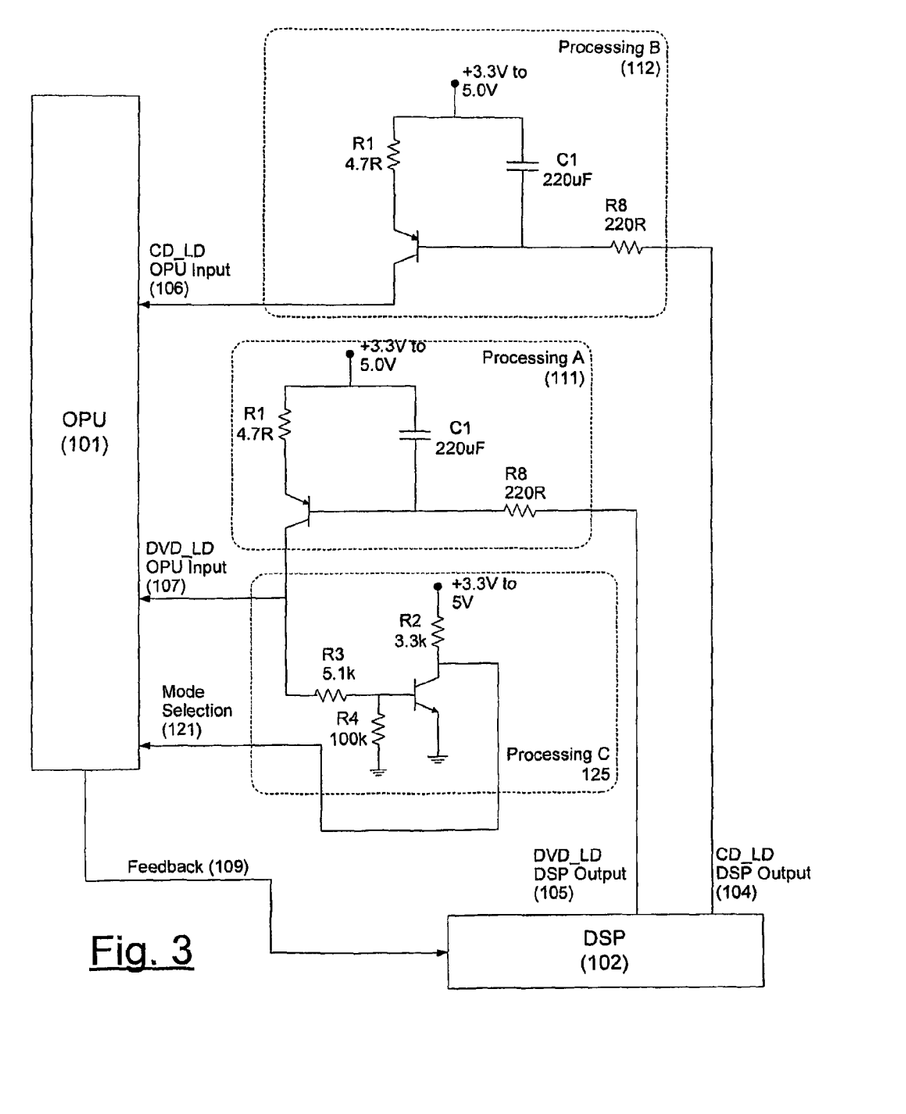
FIG. 3 depicts circuitry coupling an OPU to a DSP, including circuitry to produce a mode selection signal from a DVD laser control signal in accordance with some embodiments.

FIG. 3 depicts circuitry coupling an OPU to a DSP, including circuitry to produce a mode selection signal 121 from a DVD laser control signal (e.g., DVD_LD DSP Output 105) in accordance with some embodiments. In some embodiments, the DVD_LD DSP output 105 and the CD_LD DSP Output 104 for the DSP 102 are analog signals; the DVD_LD OPU input 107 and the CD_LD OPU input 106 to the OPU are also analog signals; and the mode selection signal 121 is a logic signal. In some embodiments, the feedback signal 109 is an analog signal. In some embodiments in which there is more than one feedback signal, some or all of the feedback signals (sent by the OPU to the DSP) are analog signals.

In a DVD mode, the CD_LD DSP Output 104 has a voltage in the range of approximately 3.3V to approximately 5.0V and is coupled to the base of a PNP transistor in processing B circuit 112. As a result, this PNP transistor is turned off (not activated), and the CD_LD OPU input 106 (produced by processing B circuit 112) is approximately 0V. This causes the laser diode for reading a CD to be switched off (not activated).

In the DVD mode, the DVD_LD DSP Output 105 has a voltage in the range of approximately 1V less than the voltage of the power supply (~3.3V-5.0V) and is coupled to the base of a PNP transistor in processing A circuit 111. As a result, this PNP transistor is activated and operates as a current amplifier, and the DVD_LD OPU input 107 (produced by circuit 111) has a voltage in the range of approximately 2.0V to approximately 2.5V. This causes the laser diode for reading a DVD to be activated. The DVD_LD OPU input 107 is also coupled to the base of an NPN transistor in processing C circuit 125. In this state (with a voltage between 2.0V and 2.5 V on the base of the NPN transistor), processing C circuit 125 produces a mode selection 121 that has a value of approximately 0V. When a DVD is detected while in the DVD mode, one or more feedback signals 109 instruct the DSP to remain in the DVD mode.

When a CD is loaded while the device is in the DVD mode, the DSP will find that the optical disk is not compatible with the current mode of operation from processing the feedback signal 109. The DSP is programmed to respond to the feedback signal 109 by switching to a CD mode and changing the values of its outputs. In the CD mode, the DVD_LD DSP output 105 is switched to a value in the range of approximately 3.3V to approximately 5.0V, in turn causing the DVD_LD OPU input 107 to be about 0V and the mode selection 121 to be about 5.0V, corresponding to a logic high value. In this state, the sensor in the OPU 101 is configured to receive light signals from a CD instead of a DVD. Further, in the CD mode, the CD_LD DSP Output 104 produced by the DSP 102 has a value of approximately 1.0V less than the voltage of the power supply (~3.3V-5.0V). Processing B circuit 112 converts the CD_LD DSP Output 104 into a CD_LD OPU input 106 having a value between approximately 1.8V and 2.3V, which activates the infrared laser diode for reading a CD.

Figure 4:
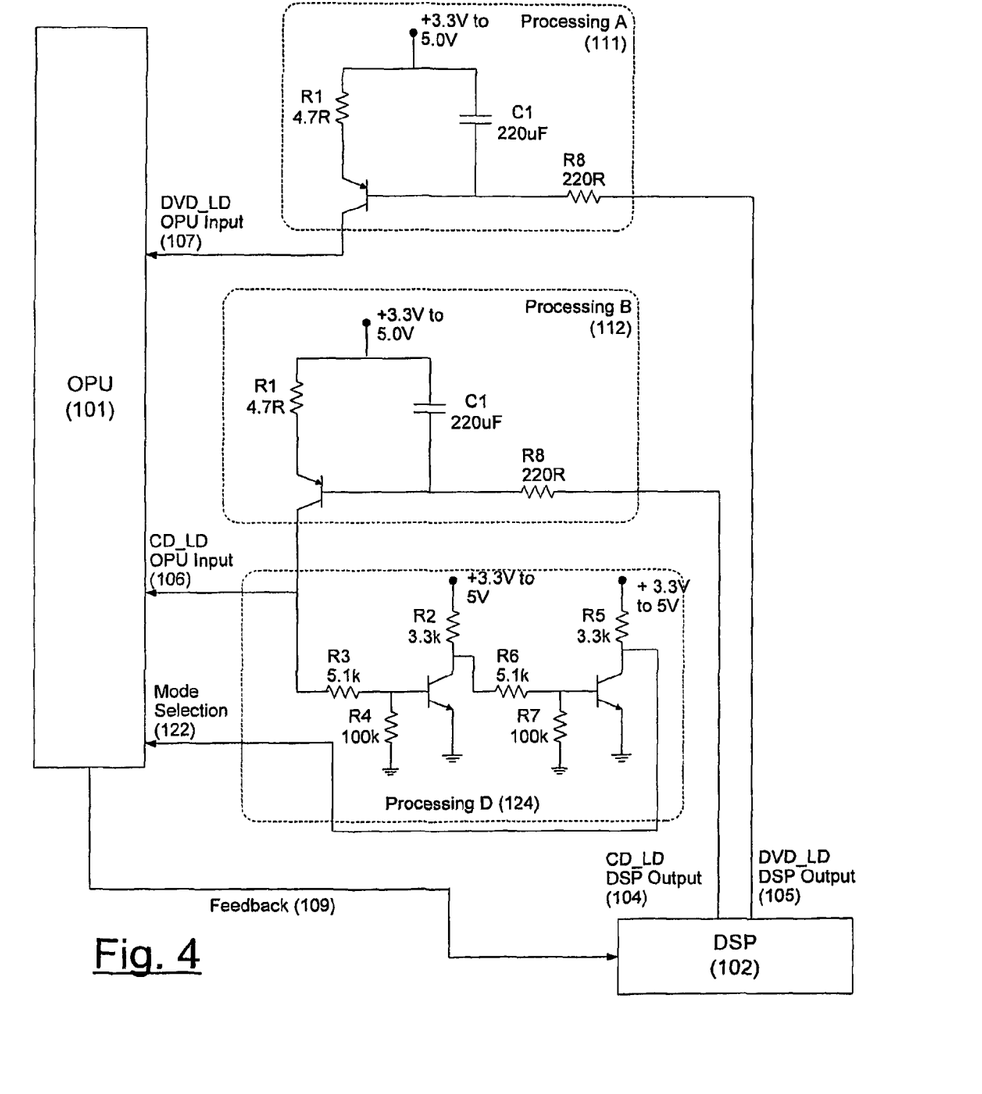
FIG. 4 depicts circuitry coupling an OPU to a DSP, including circuitry to produce a mode selection signal from a CD laser control signal in accordance with some embodiments.

FIG. 4 depicts circuitry coupling an OPU to a DSP, including circuitry to produce a mode selection signal from a CD laser control signal in accordance with some embodiments. FIG. 4 is different from FIG. 3 in that the mode selection is derived from the CD_LD OPU input 106 (which in turn is derived from the CD_LD DSP output 104) instead of the DVD_LD OPU input 107 (which in turn is derived from the DVD_LD DSP output 105). In a DVD mode, the CD_LD DSP Output 104 has a value in the range of approximately 3.3V to approximately 5.0V. The CD_LD DSP Output 104 is coupled to the base of the PNP transistor in processing B circuit 112. In this state, the PNP transistor in processing B circuit 112 is turned off, and as a result the processing B circuit 112 sets the CD_LD OPU input 106 to approximately 0V, and the infrared laser for reading a CD is not activated.

In Processing D circuit 124, the CD_LD OPU input 106 is connected to the base of a first NPN transistor through resistor R3 and R4, the collector of which is coupled to the base of a second NPN transistor in processing D circuit 124. In the DVD mode, the approximately 0V input to the base of the first NPN transistor causes the collector of the first NPN transistor and the base of the second NPN transistor in processing D circuit 124 to have a voltage of approximately 3.3 to 5V. This, in turn, causes the second NPN transistor to output a mode selection signal 122 of approximately 0V, which causes the OPU's optical sensor 212 (FIG. 2A) to operate in a DVD mode.

In the DVD mode, the DVD_LD DSP output 104 will have a value approximately in the range of 1V less than the voltage of the power supply. This signal is received by the processing A circuit 111, which causes the processing A circuit 111 to generate the DVD_LD OPU input signal 107 with a voltage in the range of approximately 2.0V to 2.5V. When the DVD_LD OPU input signal 107 has a voltage in this range, it activates the red laser (in the OPU 101) that is used to read DVD's.

In a CD mode, the CD_LD DSP output 104 will be switched to a value of approximately 1.0V less than the voltage of the power supply, in turn causing the CD_LD OPU input 106 (generated by processing B circuit 112 from the CD_LD DSP output 104) to be within a range of approximately 1.8V to 2.5V, which activates the infrared laser used to read CD's. In the CD mode, the mode selection signal 122 should be about 5.0V, a logic high, which causes the OPU's optical sensor 212 (FIG. 2A) to operate in a CD mode (for receiving light signals from a CD instead of a DVD). Further, in the CD mode, the DVD_LD DSP Output 105 has a voltage in the range of approximately 3.3V to 5.0V, which causes the processing A circuit 111 to generate a DVD_LD OPU input signal 107 having a voltage of about 0V, which deactivates the red laser diode for reading DVD's.

In some embodiments, the processing circuit between the DVD_LD OPU analog input 107 or the CD_LD OPU analog input 106 and the mode selection digital input 121/122 can be viewed as a circuit for generating a digital logic signal. In contrast, the processing circuit 111 between the DVD_LD DSP analog output 105 and the DVD_LD OPU analog input 107, and the processing circuit 112 between the CD_LD DSP analog output 104 and the CD_LD OPU analog input 106 can each be viewed as a circuit for modifying an analog signal from one analog value into another analog value.

The embodiments illustrated by FIGS. 3 and 4 have processing circuitry (e.g. processing C circuit 125 and processing D circuit 124) external to the OPU. However, in other embodiments, the processing circuitry for generating a digital mode selection signal from an analog laser control signal is built into the OPU 101, in which case the mode selection is determined internally within the OPU 101 based upon the DVD_LD OPU input 107 or the CD_LD OPU input 106.

Figure 5A:
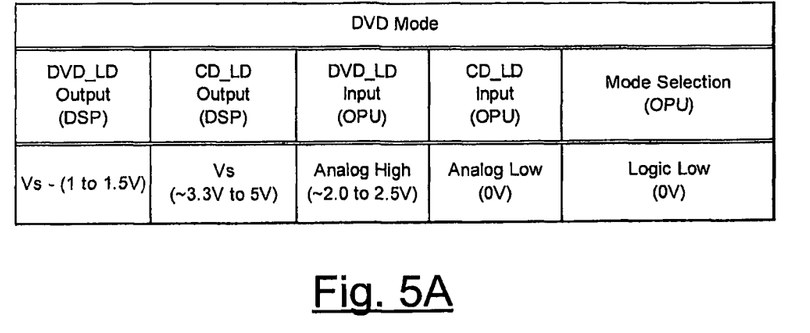
Figure 5B:
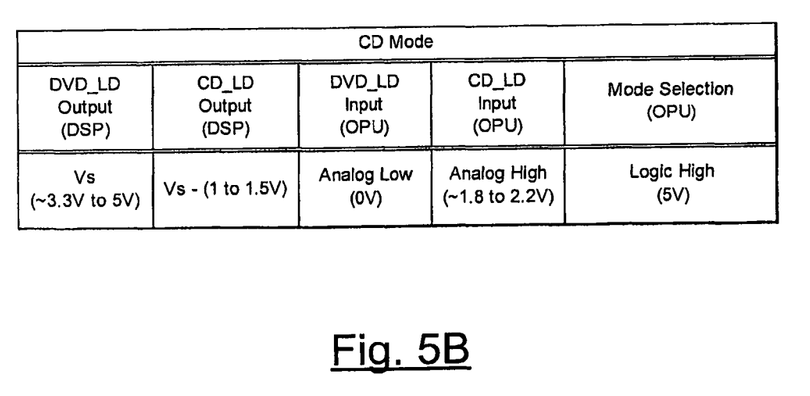

FIGS. 5A and 5B are tables illustrating different values for different DSP outputs and different OPU inputs in the DVD mode and CD mode, respectively, in accordance with some embodiments. In summary, while the DVD/CD player or karaoke player is in DVD mode, the DVD_LD DSP output is approximately 1.0V less than the voltage of the power supply (which may be called the analog low voltage range for this DSP output signal) and the DVD_LD OPU input is approximately 2.0V to 2.5V (which enables the laser used for reading DVD's, and may be called the analog high voltage range for this OPU input signal). In the DVD mode, the CD_LD DSP output is in the range of approximately 3.3V to 5.0V, while the CD_LD OPU input is approximately 0V (which keeps the laser for reading CD's turned off). In the DVD mode, the mode selection signal for the OPU sensor is at a logic low (e.g., 0V). In other embodiments, of course, other voltages or voltage ranges may be used to implement these signals.

On the other hand, when the DVD/CD player or karaoke player is in the CD mode, the DVD_LD DSP output is approximate 3.3V to 5.0V and the DVD_LD OPU input is approximately 0V (which keeps the laser for reading DVD's turned off). The CD_LD DSP output is approximately 1.0V less than the voltage of the power supply, while the CD_LD OPU input is approximately 1.8V to about 2.2V (which enables the laser used for reading CD's, and may be called the analog high voltage range for this OPU input signal). In the CD mode, the mode selection for the OPU sensor is at a logic high (e.g., approximately 5.0V, in one embodiment).

Figure 6:
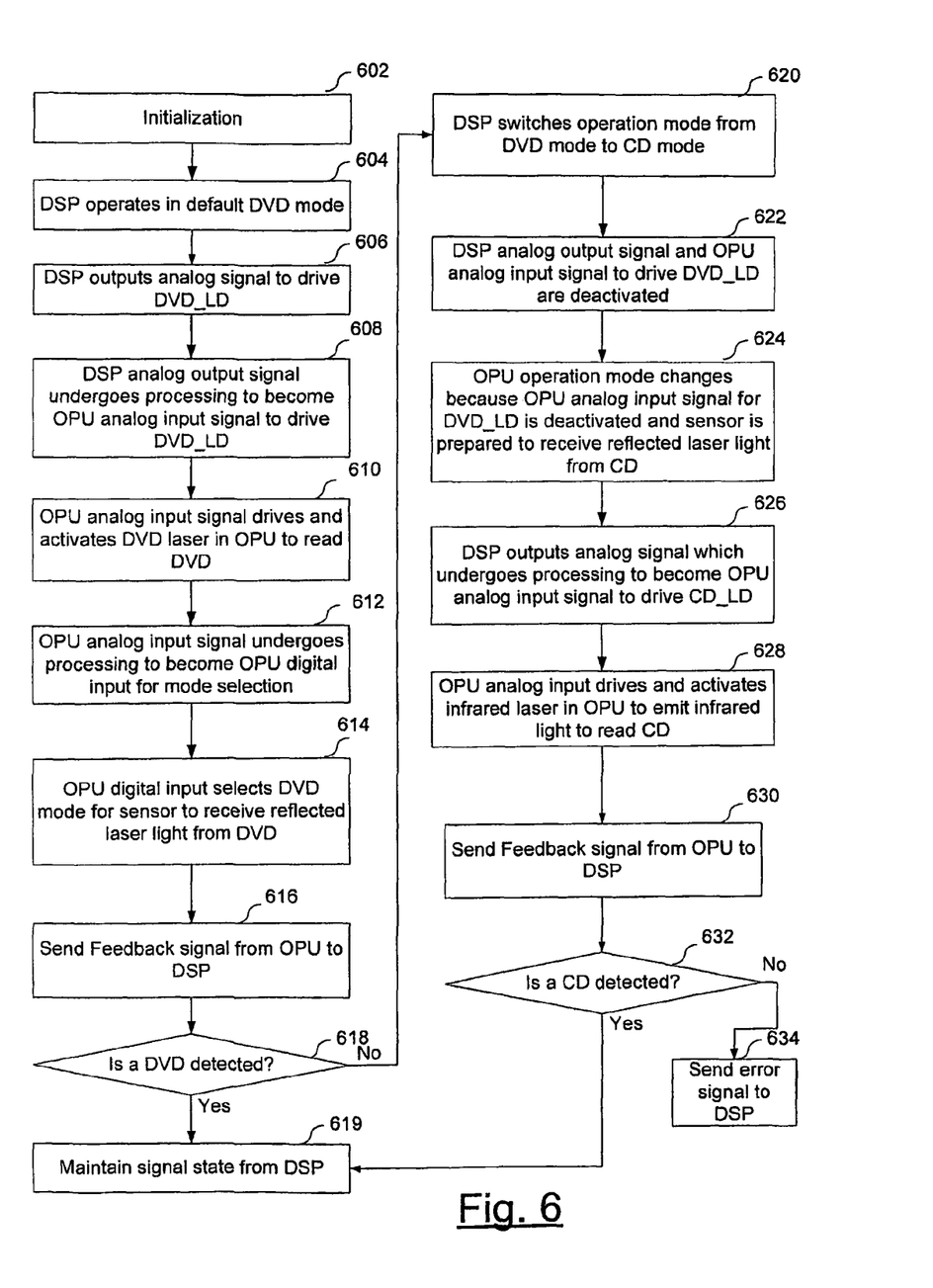
FIG. 6 is a flow chart illustrating a decision process for a DVD/CD player for selecting a DVD/CD mode in accordance with some embodiments.

FIG. 6 is a flow chart illustrating the decision process for a DVD/CD player for selecting a DVD/CD mode in accordance with some embodiments. In some embodiments, at initialization (602), a karaoke player is turned on and a disc is loaded into the karaoke player. Acting as a "master," the DSP operates in a default DVD mode (604); the DSP's signal processing activities and outputs are set in accordance with the DVD mode. A DSP output analog signal is activated by the DSP to drive the laser diode to emit a red laser beam onto the disc (606). This DSP output analog signal undergoes processing (e.g. by processing A circuit 111, FIG. 1B or 1C) to become the OPU analog input signal to drive the laser diode in an OPU (608). The laser diode produces light (e.g., red light) used to read a DVD (610). Also, the OPU analog input signal is processed (e.g. by processing C circuit 125, FIG. 1B) to become a mode selection input signal 121 that is received by the OPU and used by the OPU to select a mode for its optical sensor (612). In this example, the mode selection signal received by the OPU causes it to select the DVD mode for the OPU's optical sensor, which is then configured to receive laser light reflected from a DVD (614). In response to the reflected laser light (205, FIG. 2A), the OPU generates feedback signals 109 and returns the feedback signal to the DSP (616). From processing the feedback signal, the DSP determines whether the loaded disc is a DVD (618). If a DVD is detected (618-Yes), then the DSP maintains its signal state from the DSP (619).

If a DVD is not detected (618-No), the DSP switches its operation mode from the DVD mode to the CD mode (620). The DSP analog output signal and the OPU analog input signal for the DVD mode are deactivated in response to the mode change (622). The OPU operation mode also changes because the mode selection signal is derived from the CD_LD OPU input signal (624). As a result the optical sensor in the OPU switches mode and is prepared to receive reflected light from a CD instead of a DVD (624). The CD_LD DSP output analog signal, produced by the DSP, is processed (e.g. by processing circuit B 112, FIG. 1B) to become an OPU analog input signal (e.g., CD_LD OPU input signal 106) that is used to drive the laser diode in the OPU to emit an infrared laser beam (626). The CD_LD OPU input signal drives a laser diode in the OPU to emit lights onto a CD (628). In response to the reflected laser light (205, FIG. 2A), the OPU generates a feedback signal 109 and returns the feedback signal 109 to the DSP (630). From processing the feedback signal, the DSP determines whether the loaded disc is a CD (632). If a CD is detected (632-Yes), the DSP maintains its signal state (CD mode) in the DSP. If a CD is not detected (632-No), a disc reading error signal is generated by the DSP (634).

Figure 7:
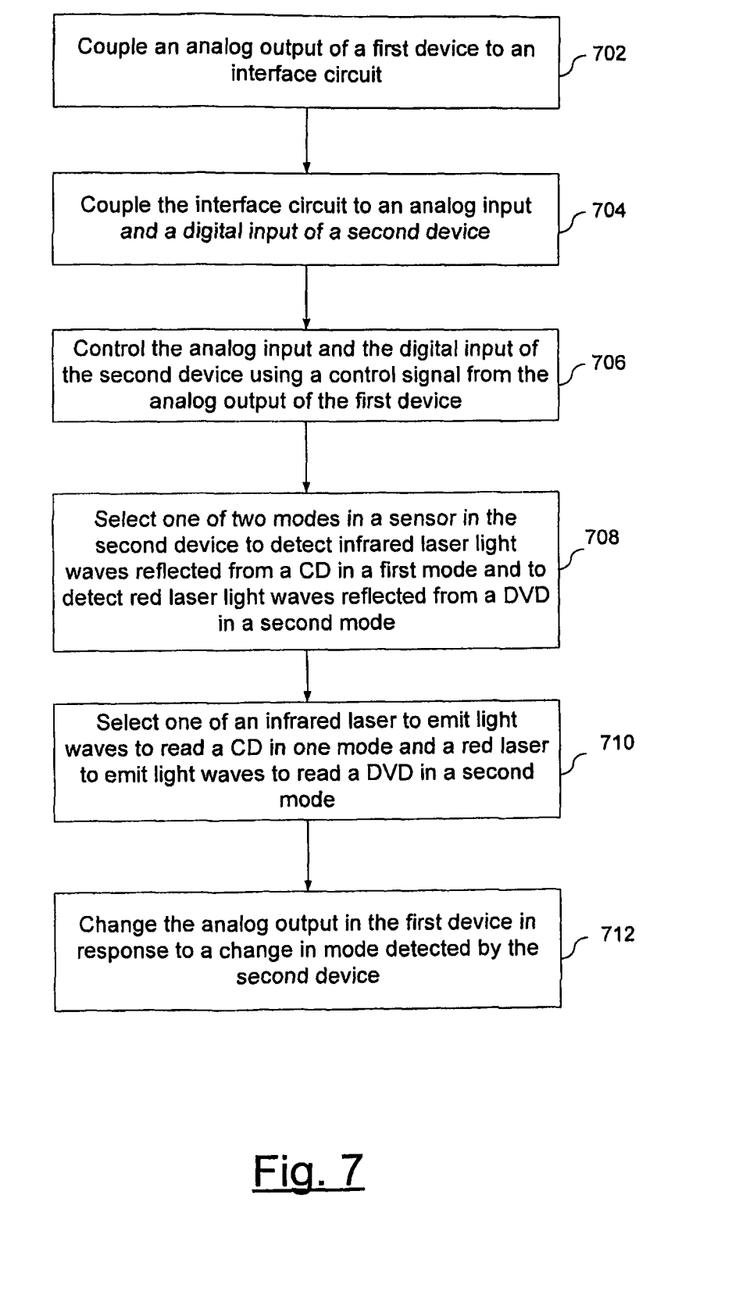
FIG. 7 is a flow chart illustrating a method of changing mode selection from DVD to CD and vice versa in a CD/DVD reader, in accordance with some embodiments.

FIG. 7 is a flow diagram illustrating a method of operating devices in an apparatus to read DVD's and CD's, and changing mode from DVD mode to CD mode and vice versa, in accordance with some embodiments. In some embodiments, an analog output of a first device, such as a DSP, is coupled to an interface circuit (702). Specifically, the analog output of the first device is an input to the interface circuit. The interface circuit is further coupled to an analog input and a digital input of a second device (704). For example, an output of the interface circuit may be coupled to the analog input and digital input of the second device, such as an OPU. In some embodiments, the output of the interface circuit is indirectly coupled to the digital input of the second device via a second interface circuit. For example, in some embodiments the second interface circuit receives the output of the first interface circuit, and processes the signal from the first interface circuit to produce the digital input of the second device.

In some embodiments, a control signal from the analog output of the first device is used to control the analog input and the digital input of the second device (706). The control signal from the analog output of the first device may be used as a driver signal to determine the operational mode in the second device. For example, the analog output of the first device can be used to generate a control signal that determines the operational mode of at least one component in the second device. In some embodiments, the control signal acts as a driver signal as well as a mode selection signal to control the operational mode of the second device. Within the second device, in some embodiments, is a sensor, controlled by the control signal from the analog output of the first device, to detect infrared laser light waves reflected from a CD in a first mode, and to detect red laser light waves reflected from a DVD in a second mode (708). Also, one of two lasers are selected or enabled for reading data from either a CD in one mode or a DVD in another mode (710). No more than one of the two lasers is enabled at any one time. In some embodiments, there may be more than one analog input to the second device, where each analog input to the second device is dedicated to driving a respective laser. For example, two analog inputs to the second device, generated by interface circuits from two analog outputs of the first device, are used to drive an infrared laser to emit light waves to read a CD in a first mode, and to drive a red laser to emit light waves to read a DVD in a second mode. In some embodiments, the first device identifies a change in mode in the feedback signal from the second device and updates the analog output in the first device accordingly (712). For example, the analog output in the first device may change in response to a feedback signal that indicates a mode change in the second device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus, comprising:
a first device having an analog output;
a second device having a digital input and an analog input; and
an interface circuit coupling the analog output of the first device to the digital input and the analog input in the second device, the interface circuit including circuitry to use a single control signal from the analog output of the first device to control the digital input and the analog input in the second device;
wherein the second device includes an optical sensor for converting optical signals reflected by a CD or a DVD into electrical signals;
wherein the digital input in the second device is a mode selection signal and is configured to select one of a first mode or a second mode in the optical sensor; and
wherein the first mode is to detect CD laser light and the second mode is to detect DVD laser light, the CD laser light and DVD laser light having distinct wavelengths.

2. The apparatus in claim 1 wherein the first device and the second device are components of a DVD/CD player.

3. The apparatus in claim 2 wherein the first device is a digital signal processor.

4. The apparatus in claim 3 wherein the second device is an optical pick-up unit.

5. The apparatus in claim 4 wherein the apparatus comprises a karaoke player.

6. The apparatus in claim 1, the second device including a CD laser and a DVD laser, wherein the analog input in the second device is for activation of one of the CD laser and DVD laser for reading data from a CD or a DVD.

7. The apparatus in claim 1 wherein the analog output of the first device has a logic relationship with respect to the digital input of the second device.

8. The apparatus in claim 1 wherein the interface circuit comprises at least first circuitry for generating the analog input from the analog output of the first device, and second circuitry for generating the digital input from the analog input.

9. The apparatus in claim 1 wherein the first device and the second device have a master-slave relationship with the first device being the master and the second device being the slave.

10. The apparatus in claim 1 wherein the second device has a laser diode for reading at least one of a DVD and CD and a sensor for translating optical inputs, comprising laser diode generated light reflected from the DVD or CD, into electrical outputs that are sent to the first device to complete a feedback loop.

11. A method for controlling different inputs, comprising:
coupling an analog output of a first device to an interface circuit;
coupling the interface circuit to an analog input and a digital input of a second device, wherein the digital input in the second device is a mode selection signal;
controlling the analog input and the digital input of the second device using a control signal from the analog output of the first device; and
in accordance with the mode selection signal, selecting one of a first mode and a second mode in a sensor in the second device, wherein the first mode is to detect infrared laser light waves reflected from a CD and the second mode is to detect red laser light waves reflected from a DVD.

12. The method of claim 11 further comprising coupling a second interface circuit between the analog input and the digital input.

13. The method of claim 11 wherein the analog output of the first device has a logic relationship with respect to the digital input of the second device.

14. The method of claim 11 wherein the first device is a digital signal processor (DSP) and the second device is an optical pick-up unit (OPU) of a DVD/CD player.

15. The method of claim 11 further comprising selecting one of a red laser to emit light waves to read a DVD and an infrared laser to emit light waves to read a CD.

16. The method of claim 11 further comprising changing the analog output of the first device from a first value into a second value in response to a feedback signal from the second device.

17. The method of claim 11 further comprising changing the analog output in the first device in response to a change in mode detected by the second device.

* * * * *